United States Patent
Meile et al.

(10) Patent No.: US 10,942,020 B2
(45) Date of Patent: Mar. 9, 2021

(54) SYSTEM FOR DETERMINING A STATE OF A TOOL POSITIONING MACHINE

(71) Applicant: HEXAGON TECHNOLOGY CENTER GMBH, Heerbrugg (CH)

(72) Inventors: Silvan Meile, St. Gallen (CH); Claudio Iseli, Au (CH)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 245 days.

(21) Appl. No.: 16/155,702

(22) Filed: Oct. 9, 2018

(65) Prior Publication Data
US 2019/0107378 A1 Apr. 11, 2019

(30) Foreign Application Priority Data
Oct. 10, 2017 (EP) .................................. 17195753

(51) Int. Cl.
*G01B 5/00* (2006.01)
*G01B 21/04* (2006.01)
(Continued)

(52) U.S. Cl.
CPC ........... *G01B 5/0016* (2013.01); *G01B 5/008* (2013.01); *G01B 5/012* (2013.01); *G01B 21/042* (2013.01); *G01B 21/045* (2013.01); *G01B 3/32* (2013.01)

(58) Field of Classification Search
CPC .... G01B 5/0016; G01B 21/042; G01B 5/008; G01B 21/045; G01B 5/012; G01B 3/32; G01B 21/04
(Continued)

(56) References Cited

U.S. PATENT DOCUMENTS

| | | | | | |
|---|---|---|---|---|---|
| 4,523,450 A | * | 6/1985 | Herzog | ................ | G01B 21/042 33/502 |
| 5,125,261 A | * | 6/1992 | Powley | ................ | G01B 21/042 33/502 |

(Continued)

FOREIGN PATENT DOCUMENTS

| CN | 1191301 A | 8/1998 |
|---|---|---|
| CN | 1847777 A | 10/2006 |

(Continued)

OTHER PUBLICATIONS

Extended European Search Report dated Feb. 22, 2018 as received in Application No. 17195753.3.

*Primary Examiner* — Yaritza Guadalupe-McCall
(74) *Attorney, Agent, or Firm* — Maschoff Brennan

(57) ABSTRACT

A system for providing state information for at least a part of a tool positioning machine embodied as manipulating machine or as coordinate measuring machine is provided. The system comprises the tool positioning machine defining a machine coordinate system and having a base and a machine structure. The structure comprises a tool head and structural components for linking the tool head to the base, at least one drive mechanism for providing movability of the machine structure relative to the base, a position determining system for deriving at least one coordinate of the machine structure in the machine coordinate system and a controlling unit adapted for controlling movement of the machine structure. The system comprises a calibration setup. A calibration component is mounted on the machine structure and defines a moveable reference point, another calibration component is arranged with defined spatial relation to the base and provides a nominal calibration position.

22 Claims, 4 Drawing Sheets

(51) Int. Cl.
   *G01B 5/012* (2006.01)
   *G01B 5/008* (2006.01)
   *G01B 3/32* (2006.01)

(58) Field of Classification Search
   USPC .......................................................... 33/503
   See application file for complete search history.

(56) References Cited

U.S. PATENT DOCUMENTS

| | | | |
|---|---|---|---|
| 5,154,002 A * | 10/1992 | Ulbrich | B23Q 1/36 33/1 M |
| 6,044,569 A | 4/2000 | Ogihara et al. | |
| 9,952,044 B2 * | 4/2018 | Gatton | G01B 21/042 |
| 10,422,636 B2 * | 9/2019 | Nakagawa | G01B 21/045 |
| 10,429,166 B2 * | 10/2019 | Nakagawa | G01B 5/008 |
| 10,429,167 B2 * | 10/2019 | Nakagawa | G01B 21/045 |
| 2006/0235636 A1 | 10/2006 | Madlener et al. | |
| 2010/0018069 A1 | 1/2010 | Ould et al. | |
| 2014/0249772 A1 | 9/2014 | Sprenger | |
| 2016/0084625 A1 | 3/2016 | Pettersson et al. | |
| 2016/0252437 A1 | 9/2016 | Masek et al. | |

FOREIGN PATENT DOCUMENTS

| | | |
|---|---|---|
| CN | 101622513 A | 1/2010 |
| CN | 103968766 A | 8/2014 |
| CN | 104655063 A | 5/2015 |
| CN | 105444707 A | 3/2016 |
| CN | 105683737 A | 6/2016 |
| EP | 0 389 108 A2 | 9/1990 |
| EP | 1 559 990 A2 | 8/2005 |
| EP | 1 687 589 B1 | 9/2012 |
| WO | 2007/058610 A1 | 5/2007 |

* cited by examiner

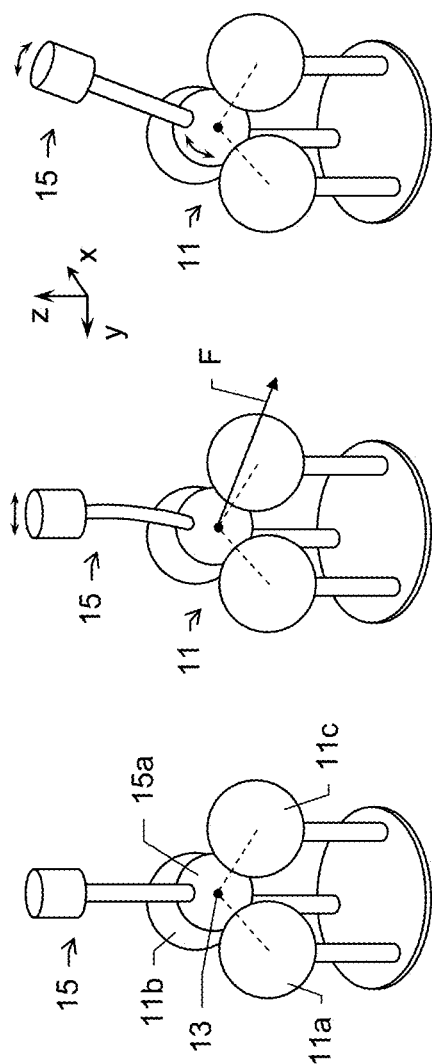

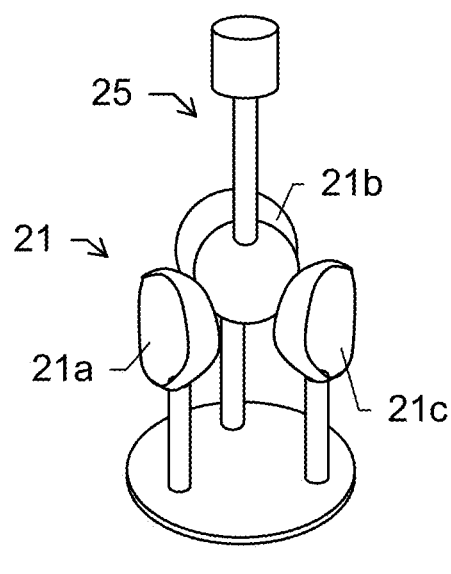
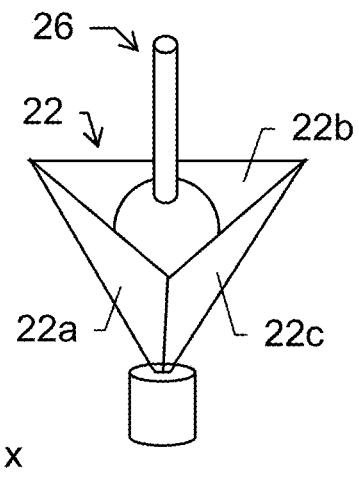
Fig. 4a   Fig. 4b
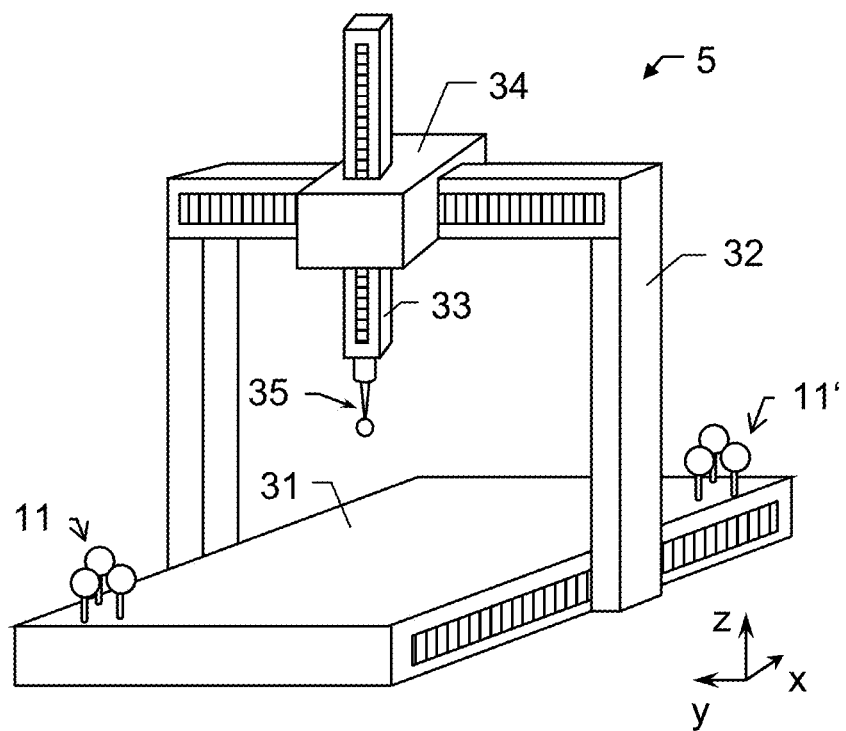
Fig. 5

SYSTEM FOR DETERMINING A STATE OF A TOOL POSITIONING MACHINE

CROSS-REFERENCE TO RELATED APPLICATIONS

This application claims priority to European Patent Application No. 17195753.3 filed on Oct. 10, 2017, which is incorporated herein by reference.

FIELD OF THE INVENTION

The present invention generally pertains to a method and system for compensation of long term deviation in a coordinate measuring machine (CMM).

BACKGROUND

It is common practice to inspect work pieces subsequent to production on a coordinate positioning apparatus, such as a coordinate measuring machine (CMM; as one example for a positioning machine), in order to check for correctness of predefined object parameters, like dimensions and shape of the object.

In a conventional 3-D coordinate measurement machine, a probe head is supported for movement along three mutually perpendicular axes (in directions x, y and z). Thereby, the probe head can be guided to any arbitrary point in space of a measuring volume of the coordinate measuring machine and the object is measurable with a measurement sensor (probe) carried by the probe head.

In a simple form of the machine a suitable transducer mounted parallel to each axis is able to determine the position of the probe head and the provided probe relative to a base of the machine and, therefore, to determine the coordinates of a measurement point on the object being approached by the probe. For providing movability of the probe head a typical coordinate measuring machine may comprise a frame structure on which the probe head is arranged and driving means for moving frame components of the frame structure relative to each other.

For measuring surface variations, both measurement principles based on use of tactile sensors and of optical sensors are known.

In general, to provide a coordinate measuring machine with high measurement precision, its frame structure is therefore usually designed to have a high static stiffness. In order to achieve a stiff and rigid machine design, the frame structure or at least parts of it, is often made of stone, such as granite. Besides all the positive effects like thermal stability and good damping properties, the granite or other stiff materials also makes the machine and the movable frame elements quite heavy. The high weight on the other side also requires high forces for a decent acceleration.

However, weight reduction is a main topic relating to the designs of coordinate measuring machines, as if the machine components are built comprising less weight (and less stiffness) faster positioning of respective components can be achieved by causing fewer force affecting the coordinate measuring machine. On the other hand the influence of machine vibrations and torsions caused by reduced stiffness and (faster) movement of the machine components increase with weight reduction of these parts. Thus, uncertainties of derived measurement values and errors occurring from such deformations and vibrations increase accordingly.

Therefore, especially with view to weight reduction but also for conventional machines, an accurate error handling is an important aspect.

For both approaches (heavy and light weight) an initial calibration procedure of the respective CMM is necessary particular for determining static and repeatable errors of the respective system. For maintaining stable and accurate measuring requirements, such a calibration preferably is to be executed in defined intervals due to taking account of external influences affecting the measuring system over time, e.g. changes of environmental parameters (temperature, humidity etc.) or mechanical impacts.

The calibration of a CMM may provide an improvement of a model which describes the static and/or dynamic behaviour of the CMM under certain conditions. Thereby, current calibration parameters may be used for actualising the defined model in order to more precisely—and adapted to current conditions—describe the behaviour of the CMM.

Typically, a so called compensation map is derived by the calibration procedure, wherein the map provides a compensation of each measuring value, which is acquired by measuring a measuring point of an object. Such a map may be designed as a kind of look-up table, i.e. for every coordinate or for defined coordinate steps of each axis of the CMM a corresponding compensated value is provided and an originally measured value is replaced by the compensated one. Alternatively, specified equations are determined and the equations are applied to measured position values for calculation of corresponding corrected values, thus providing a kind of compensation map.

Exemplarily for error handling, EP 1 559 990 discloses a coordinate measuring system and method of correcting coordinates measured in a coordinate measuring machine, measuring geometrical errors while parts with various weights are mounted on the coordinate measuring machine.

Compensation parameters are derived from measured results per a weight of a part and stored. A compensation parameter corresponding to a weight of a part to be measured is appropriately read out to correct measured coordinates of the part to be measured.

As a further example, EP 1 687 589 discloses a method of error compensation in a coordinate measuring machine with an articulating probe head having a surface detecting device. The surface detecting device is rotated about at least one axis of the articulating probe head during measurement. The method comprises the steps of: determining the stiffness of the whole or part of the apparatus, determining one or more factors which relate to the load applied by the articulating probe head at any particular instant and determining the measurement error at the surface sensing device caused by the load.

Furthermore, the additional influence of the type of probe and of each probe for itself (due to given variations in probe assemblies) to be used for measurements may be considered. In the following, touch probes for taking tactile measurements are addressed.

Deriving a compensation map for a touch probe may be quite time consuming as for that a plurality of measuring points on a specific artefact are typically to be measured. The artefact is preferably designed as a sphere.

Another aspect are long-term drifts in the CMM or an alternative positioning machine, like a computer controlled manipulator, e.g. milling or welding machine or robot. Such drifts may cause errors in position determination for respective machine axes. Drifts may occur due to thermal, humidity or mechanical influences and in particular moderately increase over comparatively long time periods.

Such errors are typically managed by conducting on-site calibration of a respective machine in defined time intervals. A common method known from the art is to put a calibration sphere into the measuring volume of the machine and to measure the well known dimensions of the sphere by an attached measuring tool. Based on a fitting of the measuring results, and particular a comparison with prior measuring results, respective negative influences can be identified and compensated. However, such measurement is comparatively time-consuming and often related to downtimes of an entire production process.

SUMMARY

Some embodiments of the present invention provide an improved method and/or system for handling long-term errors of a positioning machine.

Some embodiments provide an improved system for calibrating a positioning machine in defined intervals with optimized time management and accuracy, in particular faster with at least same accuracy compared to prior art.

Some embodiments provide an improved way of calibrating a positioning machine.

Some embodiments are achieved by realising the features of the independent claims. Features which further develop the invention in an alternative or advantageous manner are described in the dependent patent claims.

In some embodiments, the present invention relates to an approach to reduce or avoid typical long-term errors of positioning machines. The idea is to use a specific calibration artefact which is designed to provide exact positional information in case of being measured. Moreover, a nominal calibration position, which may be provided by the artefact, should be accessible and measurable by the positioning machine.

In some embodiments, the nominal calibration position may be provided by the calibration artefact or a touch tool, wherein the artefact or respectively touch tool is (modularly or fixedly) arranged with known spatial relation to or at the positioning machine. The nominal calibration position is exactly known in machine coordinates. As a counterpart, there is additionally provided a moveable reference point on side of the moving machine, i.e. the moveable reference point can be varied and moved by means of a controllable machine structure. The moveable reference point may be provided the respective counterpart to the component which provides the nominal calibration position, i.e. by the touch tool or the artefact respectively.

In some embodiments, for calibration or re-calibration of the positioning machine the moveable reference point is approached and in particular brought in correspondence or coincidence with the nominal calibration position. The position of the nominal calibration position thus can be derived in relation to the reference point, i.e. actual machine coordinates can be derived for the nominal calibration position. As the position of the nominal calibration position is known in absolute machine coordinates, i.e. independent of a machine state, the actual machine coordinates for the nominal calibration position can be compared to the absolute ones and an actual machine state (e.g. deviation from the normal) can be derived.

In some embodiments, the actual machine coordinates derived e.g. by machine encoders may be (temporally) synchronised with coordinates related to the nominal calibration position.

In some embodiments, the calibration components are designed as corresponding counterparts. In particular, the calibration artefact is designed so that in case the artefact is touched in its desired direction or position by a typical touch tool an artefact-related point of touching is known. Such point may depend on the diameter of a tip (e.g. sphere) of the touch tool.

In some embodiments, the calibration artefact may comprise two touching regions for providing a well defined and exactly known artefact-related touching position or touching line, in particular with use of a machine which is limited to movement in two dimensions, i.e. in one plane. When touching the two touching regions simultaneously with a touch tool of a 2D-machine, a tool-related reference point preferably coincidences with the artefact-related touching position or with the artefact-related touching line.

In some embodiments, the calibration artefact may alternatively comprise three touching regions for providing a well defined and exactly known artefact-related touching position or touching line (also for a machine enabled to provide 3D-movement). In other words, when touching the three touching regions simultaneously with a touch tool, a tool-related reference point preferably coincidences with the artefact-related touching position or with the artefact-related touching line.

In some embodiments, the invention relates to a system for providing state information for at least a part of a tool positioning machine embodied as manipulating machine, in particular machine tool, or as coordinate measuring machine. The system comprises the tool positioning machine defining a machine coordinate system and having a base and a machine structure, in particular a portal or Scara-type machine structure, with a tool head and structural components for linking the tool head to the base, at least one drive mechanism for providing movability of the machine structure (e.g. tool head) relative to the base, a position determining system for deriving at least one coordinate of the machine structure, in particular of the tool head, in the machine coordinate system and a controlling unit adapted at least for controlling movement of the machine structure. The system further comprises a calibration setup comprising at least two calibration components which are provided by a touch tool and a calibration artefact.

In some embodiments, the state information may be represented by possible machine errors or by a state of calibration, i.e. a deviation of at least one machine parameter exceeding or approaching a defined threshold. Position, orientation and/or structural integrity or machine parts may be represented by the state information. More general, the state information provides information about a real actual setting of the machine by applying (driving) particular machine coordinates.

In some embodiments, one of the at least two calibration components is mounted on the machine structure, in particular on the tool head, and defines a moveable reference point. The one of the at least two calibration components may for instance be arranged at the tool or probe head, on a z-ram of the machine or on any other moveable bridging element. An actual coordinate of the moveable reference point is derivable by means of the position determining system. Another one of the at least two calibration components is arranged with defined spatial relation to the base and provides a nominal calibration position. The arrangement with defined spatial relation to the base may be provided in a modular manner so that the calibration components can be reproducibly mounted and dismounted. Alternatively, the arrangement is fixed.

In some embodiments, the calibration artefact comprises at least two touching regions which are aligned transverse to one another (slanted, e.g. the regions facing one common point or area of projection) and the calibration artefact and the touch tool are arranged so and moveable by the machine structure relative to each other so that simultaneous contact of the touch tool with the at least two touching regions is providable (and detectable).

It is to be understood that the artefact may comprise structurally separated components which provide the touching regions. Those components may be arranged (e.g. on the tool head or at the base) so that a combination of the components provides the simultaneous touchable touching regions. According to a particular embodiment the artefact may be designed in more compact manner, e.g. as one piece.

In some embodiments, the calibration artefact may comprise at least three touching regions which are aligned transverse to one another and the calibration artefact and the touch tool are arranged so and moveable by the tool head relative to each other so that simultaneous contact of the touch tool with the at least three touching regions is provided.

According to particular embodiments, the touch tool can be mounted on the tool or on one of the structural components head and defines the moveable reference point and the calibration artefact may be arranged with defined spatial relation to the base, in particular at the base, wherein a position of the calibration artefact is known with reference to the machine coordinate system and the calibration artefact provides the nominal calibration position by the at least two or three touching regions. The moveable reference point may be defined as the midpoint of a tip (e.g. sphere) of the touch tool.

Alternatively, the calibration artefact may be mounted on the tool head or on one of the structural components and may provide the moveable reference point by the at least two or three touching regions and the touch tool may be arranged with defined spatial relation to the base, in particular at the base, wherein a position of the touch tool and of the nominal calibration position is known with reference to the machine coordinate system.

In other words, either the calibration target is located with reference to the base or the touch tool is. The respective counter-component is mounted on the tool or probe head or on one of the structural components to be moved.

In some embodiments, as long as the at least two or three touching regions are simultaneously contacted with the touch tool, the moveable reference point is provided in a known position in the machine coordinate system. Such provides the basis for respective calibration steps. As described above, two touching regions are sufficient to provide the basis for calibration of a machine with 2D-movement, three touching regions are sufficient to provide the basis for calibration of a machine with 3D-movement. However, two touching regions may also be sufficient for calibration of a 3D-machine, e.g. in case one axis of the machine is designed to be moveable with comparatively high, stable and reproducible accuracy. Furthermore, it is to be understood that a 3D-machine may provide movement of an attached component in six degrees-of-freedom (6-DoF), i.e. three rotational and three translational degrees-of-freedom, which corresponds to a movement in three dimensions.

According to an embodiment, the controlling unit comprises a positioning functionality on execution of which the machine structure (tool head) is moved so that the moveable reference point is approached, in particular iteratively approached, to the nominal calibration position, in particular until the moveable reference point coincides with the nominal calibration position.

Such a positional approach may be based on pre-known position data concerning the calibration component which is arranged to be fixedly or modularly installed. In particular, such data can be based on a computer model, on a defined calibration plan or on a preceding (rough) measurement of the working volume, e.g. by acquiring image data.

In some embodiments of the invention, the position of one of the at least two calibration components which is mounted on the tool head or on one of the structural components may be determinable with reference to the machine coordinate system by means of the position determining system so that a respective coordinate of the moveable reference point is derivable within the limits of potential machine error. The position of the other one of the at least two calibration components may be known with reference to the machine coordinate system so that the nominal calibration position is provided in the machine coordinate system, e.g. with high positional accuracy. The controlling unit can be adapted to provide a first positional approach to bring the moveable reference point in coincidence with the nominal calibration position within the limits of the potential machine error.

By that a rough approach (in limits of the potential machine errors) of the reference point towards the calibration position can be conducted. Coincidence of the moveable reference point and the nominal calibration position may be not exactly reached that way. A fine approach can be performed afterwards so that real coincidence is provided. The fine approach may be controlled by use of force-distance signals which provide direction-related information about current force levels at the touch tool and/or artefact.

In some embodiments, the tool positioning machine may respectively comprises a force detection unit which is adapted to register a force, in particular a touch force, in at least one direction applied at the tool head (or machine structure) or at the one of the at least two calibration components which is mounted on the tool head or at the other of the at least two calibration components which is fixedly or modularly arranged with defined spatial relation to the base. The force detection unit may comprise a force sensor, a pressure sensor, strain gauge or a flexure mechanism combined with a deflection sensing unit (e.g. linear variable differential transformer, capacitive distance sensor, hall sensor).

According to an embodiment of the invention, the controlling unit is adapted to move the machine structure, in particular tool head, so that touching forces applied by an interaction of the touch tool and the touching regions are set basically equal for each of the touching regions by varying the relative position of the calibration components. In other words, the relative position of the calibration components can be varied in controlled manner until touching forces are (basically) equally distributed with respect to the touching regions.

Additionally or alternatively, the controlling unit can be adapted to monitor the touching forces applied by the interaction of the touch tool and the touching regions.

Additionally or alternatively, the controlling unit can be adapted to set touching forces according to preceding calibration parameters in order to compare an actual measurement with an earlier one.

Additionally or alternatively, the system may comprise a preloaded fixation element which provides applying a touching force so that simultaneous contact of the touch tool with the at least two touching regions is provided, in particular wherein the preloaded fixation element comprises a spring. The preload prevents from lift-off of the touch tool from the touching regions. The preload force may be constant. By moving the machine a machine force can be applied to the touching regions which is a relative force which can be considered for compensation or calibration.

In an embodiment of the invention, the controlling unit can comprise a calibration functionality on execution of which the state information is provided by deriving the actual coordinate of the moveable reference point while simultaneous contact of the touch tool with the at least two and three touching regions is provided.

In some embodiments, the calibration functionality may be adapted to provide positional calibration data based on the actual coordinate of the moveable reference point and the nominal calibration position.

According to an embodiment of the invention, the calibration functionality can be adapted to provide calibration of the tool positioning machine depending on a comparison of the coordinate of the moveable reference point and the nominal calibration position, in particular based on a misalignment derived by a deviation of the coordinate of the moveable reference point and the nominal calibration position.

By deriving actual coordinates of the moveable reference point its current position can be compared with nominal coordinates for that position and possible deviations can be registered. Calibration may be performed by adjusting current position readouts for the machine axes so that there is consistence with nominal coordinates.

In some embodiments, the calibration functionality is adapted to provide global calibration data by moving at least a part of the machine structure while simultaneous contact of the touch tool with the at least two or three touching regions is provided, registering at least two sets of machine axis coordinates, in particular x-, y- and z-coordinates, and in particular registering respectively applied forces, and providing calibration of the tool positioning machine based on the nominal calibration position and the at least two sets of machine axis coordinates, in particular wherein the calibration is provided additionally based on the respectively registered forces.

That approach allows to determine potential (position) deviations for a plurality of machine alignments (states) and to derive a global error map for the positioning machine. Respective calibration or compensation steps can be applied accordingly.

According to one embodiment of the invention, the calibration functionality may be adapted to provide bending calibration data by moving at least a part of the machine structure while simultaneous contact of the touch tool with the at least two or three touching regions is provided and by that applying an increased touch force in at least one direction, determining the increased touch force applied to at least one of the two or three touching regions and deriving a bending behaviour of at least one part of the tool positioning machine as a function of at least the applied touch force, in particular by considering related machine states.

The bending behaviour can be determined for e.g. the touch tool (e.g. stylus), the probe head and/or a part of the machine structure. This means, by varying the position of at least one machine axis and thereby monitoring an effect on an emerging touching force a bending or distortion of at least one machine component can be registered. By help of some further information about the stiffness of a respective machine component a more detailed bending behaviour can be derived.

Therefore, according to an embodiment the calibration functionality may be adapted so that the moveable reference point is set in coincidence with the calibration position, in particular by execution of the positioning functionality, the machine structure is moved so that the moveable reference point remains in coincidence with the calibration position, touching forces applied by the touch tool to the touching regions are monitored and calibration data is derived based on the movement of the machine structure and the monitored touching forces.

In one embodiment of the invention, the calibration functionality is adapted to determine a switching delay for the touch tool wherein at least a part of the machine structure is moved while simultaneous contact of the touch tool with the at least two or three touching regions is provided and by that an increased touch force in at least one direction is applied. The touch force is monitored, a switching point of the touch tool is monitored and the switching-delay is derived based on the monitored touch force and the monitored switching point.

A dependency between an applied force and switching of the touch tool, e.g. for determination of a measuring point, can be derived. Thus, a force upon which a point is measured can be determined.

Furthermore, according to an embodiment a dynamic force may be applied to one of the calibration components, e.g. a harmonic vibration or frequency sweep. This allows deriving dynamic machine states like specific bending behaviour under dynamic influence (e.g. drive frequencies). Such dynamic machine states can be provided as respective calibration data.

In some embodiments, a transfer function can be derived which describes an effect at e.g. an axis encoder due to dynamic influence e.g. at the end-effector (tool). The transfer function in general may describe a propagation of a vibration from its point of generation to an effect point.

The present invention enables to conduct specific calibration approaches of above with a coordinate measuring machine. Such approaches are exemplarily and complementary described in the following in other words.

A force can be measured either at the base or tool continuously (e.g. by use of a (analogue) scanning probe). Alternatively, a trigger position can iteratively be found (e.g. by use of a so called touch-trigger probe), wherein each movement in each direction where a contact force is increased would generate a trigger. Analogue (or scanning) probes provide a constant 3D sensor signal reflecting the displacement of the tip with respect to the CMM. This signal also corresponds linearly to the touch force. Touch-trigger probes on the other hand have an electrical switching behaviour when a force is applied.

Therefore, a machine axis position together with a spatial force sensing value may be required or a 3D-trigger position can be achieved to get a reference position.

For a compensation of drifts and a respective periodic recalibration there are at least two different scenarios which can be provided with the present invention:

1) Generate a defined force in the course of touching the artefact. The force is controlled to be as similar as possible to an earlier calibration force. Read out machine axis positions while applying the force and compare these positions to respective earlier calibration positions. Estimate actual (new) offset values based thereon. The force might be minimised in addition to minimise deformations.

2) During local deformation, a 3×3 matrix can be estimated representing the static stiffness at this position/state (based on position and force measurements). This information may be used to derive an actual deformation of a probe tip in space by multiplying an actual measured force-vector with the above-mentioned known matrix and add a resulting deformation vector to respectively measured machine axis positions to estimate a true and non-deformed state of the probe. This can be compared with earlier calibrations of that type. New offset values may be estimated accordingly.

Moreover a delay may be compensated by an approach according to the invention. Such temporal delay relates to a change of which drive axis (axes) may cause a (scanning) movement of a probe and thereto related delay in providing actual position information of a respective axis. In other words, a relevant point in time of movement (direction) change is to be derived to provide accurate determination of measuring coordinates over the entire measurement process.

For that, probe head values (trigger and/or analogue forces) may be acquired while moving harmonically around the reference point (by keeping contact with the artefact). The probe-head values can be compared with machine axis values and a latency or time delay can be determined between those two kinds of measurements. Hence, latency between a machine axis vector and a force vector (or trigger values) can be determined.

The calibration functionality may respectively be adapted to determine such machine delay with respect to the movement of the tool head by moving at least a part of the machine structure while simultaneous contact of the touch tool with the at least two touching regions is provided, wherein a direction of movement is changed during moving. The change of direction may preferably be controlled so that a main moving axis changes, e.g. from x- to y-axis, e.g. while moving a circle. A plurality of machine axes coordinates, in particular x-, y- and z-coordinates, and a plurality of applied forces and/or position signals on side of the tool head or touch tool can be registered while moving the machine structure. The machine axes coordinates can be assigned, in particular synchronised, to or with temporally related applied forces and/or position signals.

The machine delay may be derived based on a comparison of the assigned machine axes coordinates and applied forces and/or position signals.

The calibration method can be used for analogue probes. In this case the delay can be determined by moving the machine in a sinusoidal manner and measure the phase shift between machine position and probe head signal. However, the delay of touch trigger probes could also be measured by this approach.

Moreover, the invention does also provide bending (or static stiffness) compensation (with reference to mass distribution).

Forces applied in various directions (3D forces) may be increased and decreased on purpose. The read force values and machine axis values may be uses to generate a correlation between those values. This correlation matrix is the stiffness representation if moved statically (no acceleration). Otherwise, if moved dynamically, this is a combination of stiffness representation and mass distribution and or damping properties.

Together with the bending of the machine the linearity error of the probe head sensors can be calibrated.

In an embodiment, the calibration artefact comprises at least three spherical elements, in particular spheres or half-spheres, wherein the spherical elements provide the touching regions, in particular touching points. Respective elements are preferably designed so that the touch tool has contact with only a very small part of the element when brought into calibration position. This allows providing artefact-related calibration position with high accuracy.

The touch tool can be embodied as a touch probe, as a scanning probe or as a touch-trigger probe.

The tool positioning machine may comprise at least two basically parallel rotational axes, in particular wherein structural segments of the machine structure are rotatable around the axes, in particular wherein the machine comprises a translational axis arranged basically collinear with one of the rotational axes, in particular wherein the rotational axes are aligned basically parallel to the gravitational field.

The tool positioning machine can be embodied as a Selective-Compliance-Articulated-Robot-Arm-Type (SCARA-Type) machine, in particular parallel SCARA-Type measuring machine. Such machine may be provided as manipulating or coordinate measuring machine.

A SCARA-based machine (e.g. CMM) can be moved faster than a comparable Cartesian machine. A single pedestal mount requires a much smaller footprint and provides an easy and flexible form of mounting the whole machine. Such SCARA-machines can be based on a serial architecture (a first "carries" all other motors). By means of the typical parallel-axis joint layout the supporting structure is basically rigid in z-direction. The base of a SCARA-machine may be embodied by a first column of the machine (e.g. pedestal).

The SCARA-type machine may be designed comprising at least two basically parallel rotational axes. Respective machine components are rotatable around those axes. In particular, the SCARA may further comprise a translational axis arranged basically collinear with one of the rotational axes. According to a specific embodiment, the rotational axes are aligned basically along (parallel) the gravitational field. Such design enables to move a probe which is arranged at a distal end of the structural chain within a comparatively large measuring volume.

A further advantage is that such kind of measuring machine does not have to be structurally integrated into the production line but can be positioned decoupled of the production line and the measuring probe can be guided to reach into the working volume of the production line. By that, vibrations or deformation effects caused by the production line do not influence coordinate measurements of such CMM.

The invention also relates to a method for deriving machine state information for at least a part of a tool positioning machine embodied as manipulating machine, in particular machine tool, or as coordinate measuring machine. The tool positioning machine defines a machine coordinate system and has a base and a machine structure, in particular a portal or Scara-type machine structure, which comprises a tool head and structural components for linking the tool head to the base, at least one drive mechanism for providing movability of the machine structure relative to the base, a position determining system for deriving at least one coordinate of the machine structure in the machine coordinate system and a controlling unit adapted for controlling movement of the machine structure.

The method comprises providing a calibration setup which comprises at least two calibration components which are provided by a touch tool and a calibration artefact.

One of the at least two calibration components is mounted on the machine structure (e.g. tool head) and defines a moveable reference point an actual coordinate of which is derivable by means of the position determining system. Another one of the at least two calibration components is (fixedly or modularly) arranged with defined spatial relation to the base and provides a nominal calibration position.

Moreover, the calibration artefact comprises at least two or three touching regions which are aligned transverse to one another and which define the nominal calibration position. The calibration artefact and the touch tool are moved by means of the machine structure relative to each other so that simultaneous contact of the touch tool with the at least two or three touching regions is provided. The machine state information is derived by the actual coordinate of the moveable reference point while simultaneous contact of the touch tool with the at least two or three touching regions is provided and the nominal calibration position.

The invention also relates to a computer program product (e.g. algorithm) having computer-executable instructions implemented for executing and processing the steps of moving the calibration artefact and the touch tool by means of the machine structure relative to each other and deriving the machine state information according to a method of above, in particular when run on a controlling unit of a system of above.

BRIEF DESCRIPTION OF THE DRAWINGS

The method and the system according to the invention are described or explained in more detail below, purely by way of example, with reference to working examples shown schematically in the drawings.

FIG. 3a-c show embodiments for determining particular states of a tool positioning machine according to the invention;

FIG. 4a-b show different embodiments of a calibration artefact and/or touching counterparts according to the invention;

FIG. 5 shows an exemplary embodiment of a system according to the invention having a tool positioning machine provided by a portal coordinate measuring machine (CMM) and a calibration setup;

DETAILED DESCRIPTION

Figure 1:
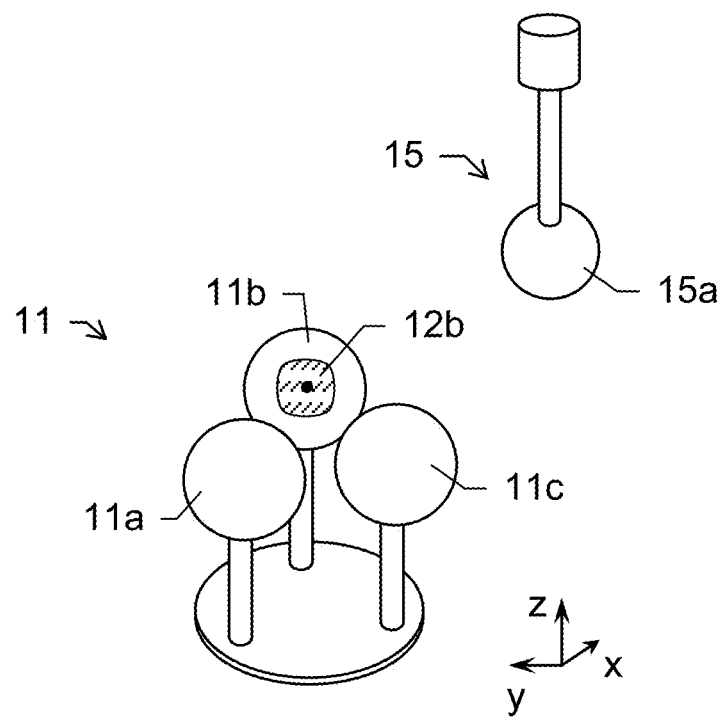
FIG. 1 shows an embodiment of a calibration setup according to the invention which comprises a calibration artefact and a touch tool.

FIG. 1 illustrates a calibration setup according to the invention which comprises a calibration artefact 11 and a touch tool 15.

The calibration artefact 11 comprises three spherical shaped elements 11a-c, in particular spheres, which are arranged in defined positional relationship relative to each other. Each spherical shaped element 11a-c provides a touching region 12a-c, exemplarily shown with element 11b and region 12b, the touching regions 12a-c are defined so that they at least partly facing each other.

Alternatively, the calibration artefact 11 may comprise two spherical shaped or two planar elements (not shown), wherein two touching regions or points are provided respectively. Such design may be used for calibration of a machine which provides planar tool-movement in two dimensions, e.g. a specific type of SCARA machine which for instance comprises (only) rotational joints for moving a tool head.

The elements 11a-c and a sphere 15a of the touch tool 15 are designed so that a gap between the elements 11a-c is of such size that the sphere 15a can not pass the centre between the elements 11a-c without contacting at least one of it. In other words, the sphere 15a of the tool 15 is of such size that is can be brought into contact with all three elements 11a-c simultaneously.

Figure 2:
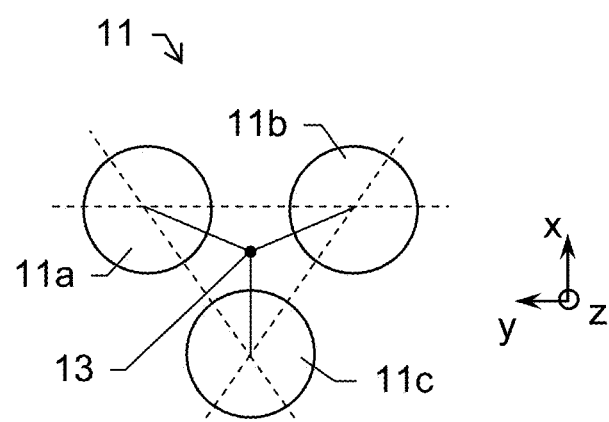
FIG. 2 illustrates an embodiment of a calibration setup according to the invention in a top-view.

The artefact 11 defines a precisely known artefact-related touching position or touching line. As can be seen from FIG. 2, which illustrates a top-view on the artefact 11, there is a particular touching point 13 defined in the gap between the three spheres 11a-c. It is to be understood that the shown touching point is not in the same plane as the direct connections of sphere centres, but is offset in vertical z-direction. The artefact-related position of the touching point 13 in z-axis depends on the one hand on the diameter and distance of the spheres 11a-c and on the other hand on a diameter of the counterpart of the calibration setup, i.e. of the touch tool. Assuming that the design of the artefact 11 remains constant, the offset of the touching point 13 out of the plane in which the centre points of the spheres 11a-c are located increases with increasing diameter of the touch sphere 15a.

Here the touching point 13 is to be understood as such point which corresponds with a tool-related reference point, in particular a centre point of the tool-tip 15a, when the touch tool 15 is in contact with each of the artefact spheres 11a-c.

The calibration setup is designed to preferably be used with a positioning machine like a coordinate measuring machine in order to derive an actual machine state. The machine state can be determined in repetitive manner, e.g. with a defined low frequency during a production process. By that, a calibration of a respective machine can be provided and updated continuously.

One part of the setup, e.g. the calibration artefact 11, may be located in defined and known (fixed) position relative to a base or reference point of the machine and thus provides a nominal calibration position. The nominal calibration position may be defined by the touching point 13 and/or by the touching regions 12a-c of the artefact 11. As the position of the calibration artefact 11 is known with reference to the machine (i.e. with reference to a machine coordinate system) the nominal calibration position is exactly known in machine coordinates as well.

The other component of the calibration setup, e.g. the touch tool 15, may respectively be mounted on a tool head and thus be moveable within a measuring volume of the machine. In such arrangement the touch tool would provide a moveable reference point the position of which is known in machine coordinates. An actual position of the moveable reference point is typically determined by means of a position determining system of the positioning machine. E.g. encoders which are assigned to particular machine axes or drives provide machine coordinates in at least three degrees of freedom and thus provide determination of the actual position of the touch tool and of the moveable reference point.

However, there may emerge an error in determination of said actual position due to drifts (e.g. thermal, long-term) or external influences (e.g. shock, collision) on the machine and its structure. As such errors or deviations mainly occur in the machine structure, i.e. in the moving elements of the machine, a re-calibration by help of a quasi position invariant element can be performed according to the invention.

Referring to the example of above, the calibration artefact 11 which may be arranged in known position relative to a base (e.g. onto the base) may provide such position invariant element. The artefact 11 can be mounted on a granite table of the machine or may generally be arranged dynamically and structurally decoupled from the machine. Moreover, the artefact 11 may be build from material of a low coefficient of thermal expansion (CTE) in order to provide constant calibration properties.

According to the present invention a re-calibration of the machine can be performed by approaching the moveable reference point to the nominal calibration position and finally setting the moveable reference point basically in coincidence with the nominal calibration position. Machine coordinates for the position of the moveable reference point can be derived while that coincidence is provided. This means, a respective coordinate may be determined for each machine axis while the touch tool is in contact with the touching regions 12a-c of the artefact 11. Moreover, force information may be acquired and additionally considered.

As the nominal calibration position is exactly known in machine coordinates but independent from any machine alignment such calibration position provides reference coordinates for calibrating the machine. Respective calibration data can be derived by a comparison of the actual machine coordinates for the position of the touch tool and the known reference coordinates of the nominal calibration position. Possible deviations between nominal coordinates and actual machine coordinates of the tool can be recorded and re-calibration of the machine can be performed based on that data.

For example, if an actual x-coordinate of the derived machine coordinates differs from the x-coordinates provided for the nominal position an encoder for the x-axis movement can be calibrated so that the actual x-coordinate corresponds to the nominal x-coordinate.

In an alternative embodiment the calibration artefact 11 may be mounted on the tool head and thus be moveable within a measuring volume of the machine, wherein the moveable reference point is provided by the artefact 11, in particular by the touching point 13 of the artefact 11. Respectively, the touch tool 15 may be arranged in known position relative to a base or relative to a particular reference point of the machine and thus provides the nominal calibration position, in particular provided by the centre point of the sphere 15a of the tool 15.

FIGS. 3a to 3c show setups and arrangements for determining particular states of a positioning machine.

In FIG. 3a an approach to determine an actual machine coordinate with respect to a nominal position as a state of the positioning machine and to calibrate the axes positions of the positioning machine is shown. For that purpose a touching element 15 of a calibration touch tool is brought into contact with three spheres 11a-c of a calibration artefact 11. Contact with specific 3d-contact force (forces in three directions) with each of the spheres 11a-c is provided in simultaneous manner which means that the touching element 15a is provided in a kind of three-point bearing in-between the spheres 11a-c. Such specific provision of the touch tool provides to exactly set the position of a reference point of the tool, e.g. of the centre point 13 of the touching element 15a. The position can be set to correspond with the precisely known calibration position 13 of the artefact (see description for FIGS. 1 and 2). A machine structure which provides movability of the touch tool may be calibrated that way with respect to positional dislocations. A displacement of the touch tool (including deformation) might be taken into account as well.

By comparing respective axis-related coordinates with each other and individually considering or weighting coordinate deviations information about not only a positional deviation in the machine structure can be derived but also an error concerning orientation of particular machine elements can be determined.

Such a re-calibration of the machine can be performed in defined time intervals or depending on a number of performed process cycles.

FIG. 3b shows an approach to derive an elastic or dynamic state of the machine or at least of a part of the machine. The touch tool 15 is in contact with the spheres of the artefact 11. In particular, the moveable reference point coincidences with the nominal calibration position. The artefact 11 (and its touching regions) is arranged relative to the machine structure in defined position.

In case the touch tool 15 is connected to the moveable positioning structure of the machine, the touch tool 15 is intended to be moved while contact with the touching regions is maintained. For example a position of the probe head is varied. By that, a force F can be applied by pressing the touch tool 15 against one or two of the touching regions. The force F can be measured by means of a respective detector on side of the touch tool 15 or probe head or on side of the calibration artefact 11.

As shown in the depicted embodiment, a result of applying the force F can be a bending of the touch tool 15. However, depending on the stiffness or compactness of the tool 15 other bending effects in the machine structure may occur alternatively or additionally. Linearity errors of a sensor in probe head may occur and be measured as well. Based on the knowledge about the measured force F and about the intended positional deviation of the tool 15 (deviation from the nominal calibration position) an information about bending or distortion behaviour of the machine structure and/or the touch tool 15 and/or substructural elements within the machine can be derived.

Furthermore, application of an increased force F between the touch tool 15 and the artefact 11 may also provide to determine a delay with reference to compliance behaviour of a mounting or base of the touch tool 15 in dependency of positional variation of the machine axes. A (bending-) delay with respect to a measuring point or with respect to a switching point of the touch probe may be derived.

Such compliance or bending information can be used or derived for different purposes. For example, the delay-determination can be performed to derive measuring properties of a newly mounted probe. In particular, behaviour of an articulated probe with respect to its particular rotational positions can be derived. Moreover, a bending or dynamic behaviour of at least a part of a CMM can be derived in order to check plausibility or precision of a particular model which describes the CMM. Alternatively or additionally, the determination of bending or elasticity by help of an artefact can be used to calibrate particular sensors of a touch probe.

Based on the relative movement of the tool head, i.e. based on applied dynamics, a distribution of stiffness along the kinematic chain and/or masses of the probe or of the CMM can be determined. Damping behaviour may be derived respectively.

FIG. 3c shows the result of a movement of the touch tool 15 with respect to the artefact 11. The tool 15 is rotated around its midpoint, i.e. it is rotated around the nominal calibration position which here corresponds with the moveable reference point of the touch tool 15. Contact of the touch tool 15 with the three spheres of the artefact 11 is maintained in course of the rotation.

A machine structure on which the touch tool 15 is mounted can take different alignments, orientations or positions, wherein the resulting position of its end-effector (here:

touch tool 15) may be identical. The touch tool 15 can remain in contact with the artefact 11 while the machine structure is moved. Respective machine coordinates which describe the alignment of the machine structure can be derived continuously or in discrete manner.

Moreover, the touch tool 15 may (additionally) be moved by an articulated probe head. Variations concerning a rotational orientation of the touch tool 15 can be provided as shown. By that, a calibration also of the articulating mechanism is possible or a combination thereof.

The state of the machine can be derived in different alignments of the structure, which means that different states of the machine can be determined by use of a calibration artefact which remains fixedly arranged. Bending effects which may occur or change due to particular positioning of the machine structure are accessible that way.

Additionally, local hysteresis effects might be observable—by moving back/forth in certain directions local hysteresis effects can be extracted. Also, linearity of force measurements (at probe) can be analyzed, e.g. to set a maximal force limit to be kept while probing/scanning a part.

FIGS. 4a and 4b show different embodiments of a calibration artefact and/or touching counterparts according to the invention.

FIG. 4a shows a calibration setup comprising a calibration artefact or target 21 and a touching counterpart 15, e.g. a touch probe for a CMM. The calibration artefact 21 comprises three touching elements 21a-c which are embodied as half-spheres. Each of the half-spheres 21a-c defines a touching zone on its curved surface inside of which the respective calibration counterpart touches the half-sphere for performing calibration. The calibration artefact as a whole defines a touching position, e.g. in the middle of the half-spheres, in defined z-position relative to the midpoints of the half-spheres 21a-c. The greater the diameter of the touch tool, the more the z-position differs for the z-position of the midpoints.

FIG. 4b shows a further embodiment for a calibration setup for determining a state of a positioning machine. The calibration artefact 22 is designed in a cone-like shape and comprises three boundary walls 22a-c which again provide respective touching regions to be touched by a calibration counterpart 26 (as shown), like a touch probe. An artefact-related calibration position is provided between the walls 22a-c. The artefact-related calibration position is defined with known reference to a mounting point of the artefact 22.

In FIG. 5 an exemplary embodiment of a positioning machine provided by a portal coordinate measuring machine 5 (CMM) according to the invention is depicted, the coordinate measuring machine 5 comprises a base 31 and a frame structure for linking a probe head with a touch probe 35 to the base 31, the frame structure comprising several frame components 32,33,34 being movable with respect to another. The first frame component 32 is a portal having two portal legs, which are connected by a bridging portion at their upper ends. Driven by a drive mechanism (not shown), the frame component 32 is capable to move along the longitudinal sides of the base 31. This direction corresponds to a first direction x. The movement of the frame component 32 for example may be performed by a gear rack attached to the base 31, which is meshing with a pinion on the frame component 32.

A carriage 34 is movably arranged on the bridging portion of the frame component 32. The movement of the carriage 34 (which is to bee seen as a further part of the machine structure) may also be achieved by a rack and pinion. A vertical rod 33 (sleeve, z-ram), building a further part of the machine structure, is movably incorporated into the carriage 34. At the bottom portion of the vertical rod 33 a touch probe 35 is provided.

The touch probe 35 is movable to any desired point in a measuring volume (work zone) of the coordinate measuring machine 5 in the directions x, y and z. The measuring volume is defined by the base 31 and the frame components 32,33 and in particular by the range of movability of the carriage 34. The three space directions x, y and z are preferably orthogonal to one another, although this is not necessary for the present invention. It should be noted that a drive mechanism and a controller for driving the frame components and, thus, for driving the probe head are not shown.

The touch probe 35 provides a moveable reference point, which e.g. corresponds to a centre point of the tip (sphere) of the probe 35.

Two calibration targets 11,11' to be measured are positioned in the space of the measuring volume (here: on the base 31). The calibration targets 11,11' are fixedly arranged at the base 31 and provide precisely known nominal calibration positions.

The artefact may alternatively (not shown) oriented differently (e.g. 90° with respect to base) and or at different height levels (quasi arbitrarily distributed in working volume).

Moreover, according to a further alternative, the system may be dimensionally reduced for example according to a 2d-kinematic (instead of 3d-kinematic; e.g. of SCARA-kinematic use the plane movements with the parallel rotary joints).

The probe head, on which a stylus 35 is arranged may alternatively embodied as an articulated probe head.

Summed up, the coordinate measuring machine 5 is built for determination of three space coordinates of a measurement point of an object and furthermore comprises the calibration targets 11,11' for determining particular states of the machine 5, and therefore comprises three linear drive mechanisms for provision of movability of the touch probe 35 relative to the base 31 in the first, second and third direction (x, y and z direction) and particularly machine components providing additional rotatory degrees of freedom (e.g. articulated probe).

In the shown embodiment, the base 31 comprises a table with a granite surface plate for supporting the artefacts 11,11' to be touched for calibration issues.

Not shown is a controlling and processing unit, which is designed to actuate the motor drives of the coordinate measuring machine 5 so that the touch probe 35 approaches and touches the calibration artefacts 11,11' with particular orientations and positions. The controlling and processing unit comprises a processor and a memory. In particular, the controlling and processing unit is designed for determining actual three space-coordinates of a position of the touch tool 35 when touching one of the artefacts 11,11' as a function of at least the first, the second and the third drive position of the three drive mechanisms. The controlling and processing unit may also be configured to determine the signal of the probe head sensor.

For manual operation, the control unit may be connected to a user console. It is also possible for the control unit to fully automatically approach each of the nominal calibration positions provided by the artefacts 11,11', in particular iteratively by means of continuously detecting direction-related touching forces applied by the tool 35 to a respective artefact 11,11'.

For calibration of the machine contact of the touch tool 35 with each of the touching surfaces of one calibration target 11,11' is necessary. This provides the moveable reference point to be in defined position in the machine coordinate system. To provide and guarantee respective touching the touching forces at each of the touching elements can be monitored. If a touching force in one direction decreases a particular threshold, this can be an indicator that contact to one of the spheres is lost.

Because the design of coordinate measuring or manipulation machines of the generic kind as well as the design of different linear guides and different linear measuring instruments are well known to skilled persons, it must be understood that numerous modifications and combinations of different features can be made. All of these modifications lie within the scope of the invention.

Thus, the invention may generally be used with all types of coordinate measuring machines, i.e. with a CMM being designed as parallel kinematics machine as well as with a CMM having linear or serial kinematics. Exemplarily, the CMM may be designed as bridge-type, L-bridge-type, horizontal-arm-type, cantilever-type or gantry-type machine or may be designed as articulated arm. Moreover, Non-Cartesian machines like having a so called SCARA structure (including rotary joints) are also within the scope of the present invention. The same of above also applies for manipulating machines, in particular machine tools.

Moreover, according to the invention, the processing unit comprises a functionality for (automatically) calibrate the machine axes, i.e. as described above.

Figure 6:
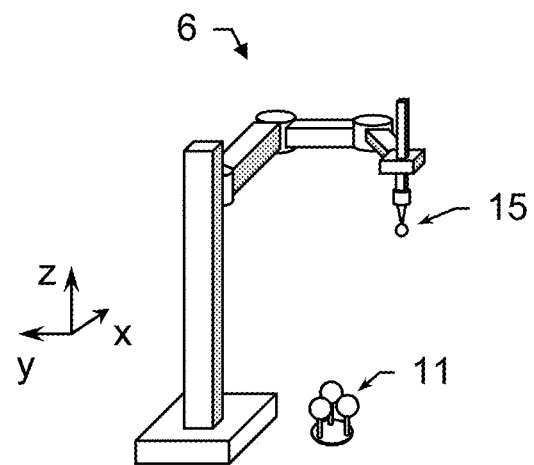
FIG. 6 shows a further embodiment of the system according to the invention.

FIG. 6 shows a further embodiment according to the invention. The tool positioning machine is designed as or comprises a coordinate measuring machine 6 as shown. The coordinate measuring machine (CMM) may be of the SCARA-type (Selective-Compliance-Articulated-Robot-Arm). Such design has the big advantage that a touch tool 15 which is mounted at a distal end (tool head) of the SCARA can be moved in very flexible manner and with comparatively high speed (compared to Cartesian machines) and the artefact 11 can be located in respectively flexible manner (inside the working volume).

The SCARA-type CMM 6 is designed comprising at least two basically parallel rotational axes. Respective machine components are rotatable around those axes. In particular, the SCARA may further comprise a translational axis arranged basically collinear with one of the rotational axes. According to a specific embodiment, the rotational axes are aligned basically along (parallel) the gravitational field. Such design enables to move a tool 15 which is arranged at a distal end of the structural chain within a comparatively large measuring volume.

Figure 7:
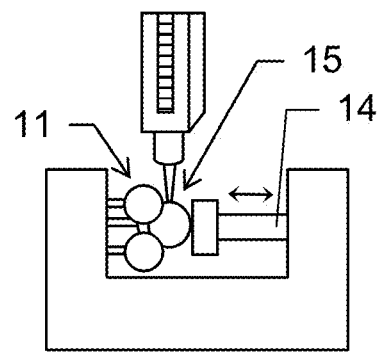
FIG. 7 shows a 3-sphere calibration setup according to the invention.

FIG. 7 shows a 3-sphere calibration setup according to the invention. The setup comprises a calibration artefact 11 on the left and a spring-preloaded ram or plunger 14 on the right. This additional spring-preloaded device 14 allows applying a force in all directions (towards the spheres of the artefact 11) without losing contact to the three ruby-spheres while conducting any of the calibration approaches of above. The three ruby-spheres are still responsible for proving accurate positioning. The preload spring provides a comparatively soft contact and does not influence the position of the probe tip.

Although the invention is illustrated above, partly with reference to some specific embodiments, it must be understood that numerous modifications and combinations of different features of the embodiments can be made and that the different features can be combined with each other or with measuring principles and/or coordinate measuring machines known from prior art.

What is claimed is:

1. A system for providing state information for at least a part of a tool positioning machine embodied as a manipulating machine or as coordinate measuring machine, the system comprising:
the tool positioning machine defining a machine coordinate system and having:
a base,
a machine structure comprising:
a tool head,
structural components for linking the tool head to the base,
at least one drive mechanism for providing movability of the machine structure relative to the base,
a position determining system for deriving at least one coordinate of the machine structure in the machine coordinate system, and
a controlling unit adapted for controlling movement of the machine structure, and a calibration setup comprising at least two calibration components which are provided by:
a touch tool, and
a calibration artefact,
wherein:
one of the at least two calibration components is mounted on the machine structure and defines a moveable reference point an actual coordinate of which is derivable by means of the position determining system,
another one of the at least two calibration components is arranged with defined spatial relation to the base and provides a nominal calibration position,
the calibration artefact comprises at least two touching regions which are aligned transverse to one another, and
the calibration artefact and the touch tool are arranged and moveable by the machine structure relative to each other so that simultaneous contact of the touch tool with the at least two touching regions is providable.

2. The system according to claim 1, wherein:
the calibration artefact comprises at least three touching regions, which are aligned transverse to one another, and
the calibration artefact and the touch tool are arranged and moveable by the machine structure relative to each other so that simultaneous contact of the touch tool with the at least three touching regions is providable, wherein the calibration artefact comprises three spherical elements, wherein the three spherical elements provide the at least three touching regions.

3. The system according to claim 1, wherein:
the touch tool is mounted on the tool head or on one of the structural components and defines the moveable reference point and the calibration artefact is arranged with defined spatial relation to the base, wherein
a position of the calibration artefact is known with reference to the machine coordinate system, and
the calibration artefact provides the nominal calibration position by the at least two touching regions.

4. The system according to claim 1, wherein:
the position of one of the at least two calibration components which is mounted on the tool head or on one of the structural components is determinable with reference to the machine coordinate system by means of the position determining system so that a respective coordinate of the moveable reference point is derivable within the limits of potential machine error, the position of the other one of the at least two calibration components is known with reference to the machine coordinate system so that the nominal calibration position is provided in the machine coordinate system, and the controlling unit is adapted to provide a first positional approach to bring the moveable reference point in coincidence with the nominal calibration position within the limits of the potential machine error.

5. The system according to claim 1, wherein:
the tool positioning machine comprises a force detection unit which is adapted to register a force, optionally a touch force (F), in at least one direction applied:
at the tool head or
at the one of the at least two calibration components which is mounted on the tool head or on one of the structural components, or
at the other of the at least two calibration components which is arranged with defined spatial relation to the base.

6. The system according to claim 1, wherein:
the controlling unit is adapted to:
move the machine structure, optionally the tool head, so that touching forces (F) applied by an interaction of the touch tool and the touching regions are set substantially equal for each of the touching regions by varying the relative position of the calibration components.

7. The system according to claim 1, wherein:
the controlling unit comprises a calibration functionality on execution of which the state information is provided by deriving the actual coordinate of the moveable reference point while simultaneous contact of the touch tool with the at least two touching regions is provided, optionally with a certain force.

8. The system according to claim 7, wherein:
the calibration functionality is adapted to provide:
calibration of the tool positioning machine depending on a comparison of the coordinate of the moveable reference point and the nominal calibration position, in particular based on a misalignment derived by a deviation of the coordinate of the moveable reference point and the nominal calibration position.

9. The system according to claim 7, wherein:
the calibration functionality is adapted to provide global calibration data by:
moving at least a part of the machine structure while simultaneous contact of the touch tool with the at least two touching regions is provided,
registering at least two sets of machine axis coordinates, in particular x-, y- and z-coordinates, and in particular registering respectively applied forces, and
providing calibration of the tool positioning machine based on the nominal calibration position and the at least two sets of machine axis coordinates, optionally wherein the calibration is provided additionally based on the respectively registered forces.

10. The system according to claim 7, wherein:
the calibration functionality is adapted so that:
the moveable reference point is set in coincidence with the nominal calibration position, optionally by execution of the positioning functionality,
the machine structure is moved so that the moveable reference point remains in coincidence with the nominal calibration position,
touching forces (F) applied by the touch tool to the touching regions are monitored, and
calibration data is derived based on the movement of the machine structure and the monitored touching forces (F),
optionally, wherein the calibration functionality is adapted to provide bending calibration data by:
moving at least a part of the machine structure while simultaneous contact of the touch tool with the at least two touching regions is provided and by that applying an increased touch force (F) in at least one direction,
determining the increased touch force (F) applied to at least one of the two touching regions, and
deriving a bending behaviour of at least one part of the tool positioning machine based on at the least the determined touch force (F).

11. The system according to claim 7, wherein:
the calibration functionality is adapted to determine a switching delay for the touch tool, wherein:
at least a part of the machine structure is moved while simultaneous contact of the touch tool with the at least two touching regions is provided and by that an increased touch force (F) in at least one direction is applied,
the touch force (F) is monitored,
a switching point of the touch tool is monitored, and
a switching-delay is derived based on the monitored touch force (F) and the monitored switching point.

12. The system according to claim 7, wherein:
the calibration functionality is adapted to determine a machine delay with respect to the movement of the machine structure by:
moving at least a part of the machine structure while simultaneous contact of the touch tool with the at least two touching regions is provided, wherein a direction of movement is changed during moving,
registering a plurality of machine axes coordinates, optionally x-, y- and z-coordinates, and a plurality of applied forces and/or position signals on side of the machine structure or touch tool while moving,
assigning, optionally synchronising, the machine axes coordinates to temporally related applied forces and/or position signals, and
deriving the machine delay based on a comparison of the assigned machine axes coordinates and applied forces and/or position signals.

13. The system according to claim 7, wherein the calibration functionality is adapted to provide:
positional calibration data based on the actual coordinate of the moveable reference point and based on the nominal calibration position.

14. The system according to claim 1, wherein:
the tool positioning machine comprises at least two basically parallel rotational axes, optionally wherein the structural components of the machine structure are rotatable around the axes, optionally wherein the tool positioning machine comprises a translational axis arranged basically collinear with one of the rotational axes, optionally wherein the rotational axes are aligned basically parallel to the gravitational field.

15. The system according to claim 1, wherein:
the machine structure is a portal or Scara-type machine structure.

16. The system according to claim 1, wherein:
the calibration artefact comprises three spherical elements that are spheres or half-spheres, and/or
the three spherical elements provide the at least three touching regions, which are touching points.

17. The system according to claim 1, wherein:
the calibration artefact is mounted on the tool head or on one of the structural components and provides the moveable reference point by the at least two touching regions and the touch tool is arranged with defined spatial relation to the base, wherein a position of the touch tool and of the nominal calibration position is known with reference to the machine coordinate system.

18. The system according to claim 1, wherein:
the system comprises a preloaded fixation element which provides applying a touching force so that simultaneous contact of the touch tool with the at least two touching regions is provided, optionally the preloaded fixation element comprises a spring.

19. The system according to claim 1, wherein:
the controlling unit is adapted to:
monitor the touching forces (F) applied by the interaction of the touch tool and the touching regions.

20. The system according to claim 1, wherein:
the controlling unit is adapted to:
set touching forces (F) according to preceding calibration parameters.

21. A method for deriving machine state information for at least a part of a tool positioning machine embodied as manipulating machine, optionally a machine tool, or as coordinate measuring machine, the tool positioning machine defining a machine coordinate system and having:
a base, and
a machine structure, optionally a portal or Scara-type machine structure, comprising:
a tool head,
structural components for linking the tool head to the base,
at least one drive mechanism for providing movability of the machine structure relative to the base,
a position determining system for deriving at least one coordinate of the machine structure in the machine coordinate system, and
a controlling unit adapted for controlling movement of the machine structure,
wherein the method comprises providing a calibration setup which comprises at least two calibration components which are provided by:
a touch tool, and
a calibration artefact,
wherein:
one of the at least two calibration components is mounted on the machine structure and defines a moveable reference point an actual coordinate of which is derivable by means of the position determining system,
another one of the at least two calibration components is arranged with defined spatial relation to the base and provides a nominal calibration position,
the calibration artefact comprises at least two touching regions which are aligned transverse to one another and which define the nominal calibration position,
the calibration artefact and the touch tool are moved by means of the machine structure relative to each other so that simultaneous contact of the touch tool with the at least two touching regions is provided, and
the machine state information is derived by:
the actual coordinate of the moveable reference point while simultaneous contact of the touch tool with the at least two touching regions is provided, and
the nominal calibration position.

22. A computer program product having computer-executable instructions stored on a tangible, non-transient computer readable medium that when executed, cause executing and processing the steps of:
moving the calibration artefact and the touch tool by means of the machine structure relative to each other,
deriving the machine state information according to the method according to claim 21, optionally when run on a controlling unit of a system.

* * * * *